United States Patent
Nativ

(10) Patent No.: US 7,365,647 B2
(45) Date of Patent: Apr. 29, 2008

(54) KINESTHETIC TRAINING SYSTEM WITH COMPOSITE FEEDBACK

(76) Inventor: Avinoam Nativ, 3428 Baskins Beach Rd., R. R. #1, Dunrobin, Ontario (CA) K0A 1T0

( * ) Notice: Subject to any disclaimer, the term of this patent is extended or adjusted under 35 U.S.C. 154(b) by 291 days.

(21) Appl. No.: 11/315,197

(22) Filed: Dec. 23, 2005

(65) Prior Publication Data
US 2007/0148624 A1      Jun. 28, 2007

(51) Int. Cl.
*G08B 23/00* (2006.01)
(52) U.S. Cl. .................. 340/573.1; 600/301; 600/546; 73/379.01
(58) Field of Classification Search ............. 340/573.1
See application file for complete search history.

(56) References Cited

U.S. PATENT DOCUMENTS

| | | | | |
|---|---|---|---|---|
| 4,811,742 A | * | 3/1989 | Hassel et al. | ............... 600/546 |
| 6,678,549 B2 | * | 1/2004 | Cusimano et al. | .......... 600/546 |
| 2002/0180605 A1 | * | 12/2002 | Ozguz et al. | ............ 340/573.1 |
| 2005/0096513 A1 | * | 5/2005 | Ozguz et al. | ............... 600/301 |
| 2007/0085690 A1 | * | 4/2007 | Tran | ........................ 340/573.1 |

* cited by examiner

*Primary Examiner*—George Bugg
(74) *Attorney, Agent, or Firm*—Anne Kinsman; Borden Ladner Gervais LLP

(57) ABSTRACT

An apparatus for training a subject to perform a specified physical activity is based on the presence of two or more kinesthetic body sensors, whether mounted on the body or separately from the body, that deliver signals to a processing system that, in turn, delivers a single output signal. This signal drives a display that delivers feedback to the subject. Multiple body sensor output signals may be combined in accordance with a predetermined algorithm to produce a single composite signal. This combining may be as simple as direct addition, or may include the combination of weighted values of the individual comparison signals. An operator may adjust the weighting values to be applied to the respective comparison signals, and may do so while the apparatus is in use. Alternately while the apparatus is in use, a proportional signal from one body sensor may drive the display, subject to suppression of such signal if the output from any number of other body sensors does not achieve preselected threshold values.

17 Claims, 6 Drawing Sheets

KINESTHETIC TRAINING SYSTEM WITH COMPOSITE FEEDBACK

FIELD OF THE INVENTION

This invention relates to the training of individuals carrying out kinesthetic activities. More particularly, it relates to the provision of feedback from various components of movements and the provision of a training environment that can help automate movements with multi-degrees of freedom. It has application in the fields of rehabilitation, athletics, recreational activity, and in any field where skill in carrying-out a physical motion or procedure must be acquired.

BACKGROUND TO THE INVENTION

The human body can be trained to carry out specific physical motions or activities through the guided procedure of repeating approximations of the desired behavior. In the field of rehabilitation, persons who have lost neuromuscular functions can relearn how to carry out such basic activities as grasping and walking, as well as more complex motions, through the process of repetition. In the recreational field, skilled players learn through repetition to carry out critical motions in the fields of tennis, basketball, golf and baseball to high degrees of precision.

It is known to train individuals to carry out a kinesthetic procedure by providing feedback which is indicative of their level of performance and progress towards achieving full competence in respect of the subject activity. A number of references in this regard are:

U.S. Pat. No. 6,413,190 to Wood et al
U.S. Pat. No. 6,032,530 to Hock
U.S. Pat. No. 5,989,157 to Walton
U.S. Pat. No. 5,692,517 to Junker
U.S. Pat. No. 5,679,004 to McGowan et al.
U.S. Pat. No. 5,697,791 to Nashner et al.
U.S. Pat. No. 5,277,197 to Church
U.S. Pat. No. 4,571,682 to Silverman, et al.
U.S. Pat. No. 3,905,355 to Brudney
U.S. Pat. No. 3,641,993 to Gaarder Such training has been effected through the use of body sensors that provide signals corresponding to specific body motions and stances. Such kinesthetic sensors can include goniometers, inclinometers, rotational sensors, force sensors, torsiometers, position sensors, bend sensors, tilt sensors, stretch sensors, pressure sensors, force sensors, velocity sensors, accelerometers, and neuromuscular electromyographic (EMG) pick-ups which identify the activation of specific muscles or muscle groups. Any sensor which can provide an indication as to the performance of a physical activity by the human body arising from the activation of specific muscles or muscle groups is relevant in this field. Hereafter such sensors are referred to as "body sensors.

A particular challenge in this field is to train multiple, distinct, body actions to operate on a coordinated basis. An example of such a movement that could be optimized through bio-kinesthetic feedback would be the case of a person learning to swing a tennis racket. Such a person may have a pressure pad placed under one, forward, foot and an inclinometer strapped to their wrist. In order to train the individual to rotate their wrist at the same time that their weight is shifted onto the forward foot, trainees are coached to carry out the motion of swinging a tennis racket while the feedback originating from the two sensors is presented to them by a suitable display.

Various types of displays to provide feedback to trainees have been proposed. One of the simplest is the creation of an image on a computer screen that presents a bar which lengthens in accordance with the value of the output originating from a body sensor. Such scalar values arise from detecting the output of a single sensor.

One particular prior art system described in part in U.S. Pat. No. 6,413,190 to Wood et al relies upon creating a video display which provides feedback to a trainee, indicating the progress that is being made towards achieving competence in a specific physical activity. Feedback is provided through the positioning of a cursor on a video screen which serves as part of a video game. Integration of this type of display into the field of kinesthetic training provides motivation for trainees to deliver appropriate signals from a body sensor and trains them to carry out an activity based on that sensor with the effort or timing necessary to acquire a functional skill.

This reference U.S. Pat. No. 6,413,190 to Wood et al teaches use of a video game such as "Pong"™, which was one of the earliest video games created for home computers. In this game a cursor in the form of a reflecting wall is moved by the game player along one edge of the screen to intersect the image of an arriving ball. The presence of the reflecting wall or "paddle" causes the ball to rebound and eventually return for a second potential interception. According to this prior art patent, the output from a body sensor is used to control the position of the reflecting wall or paddle on the video screen in various ways. For example, body sensor output above a selected threshold releases the paddle to move across a border of the screen. In the absence of a signal, the paddle may remain stationary or, in one version, move automatically to return to a "parked" location. Alternately, the paddle may move proportionally to the output from the body sensor.

In this Wood reference a body sensor provides an output in the form of a scalar value which, when such output surpasses a preset threshold, allows the trainee to exercise control and participate in the videogame. Outputs below this threshold produce no response. Further, the use of multiple body sensors is disclosed. This patent references using the output from at least two sensors to control cursor movement on the video screen. Such control can be in both X and Y directions, encouraging the trainee to manipulate the cursor as part of a video game by actuating two body sensors. However, the outputs from such multiple X, Y sensors have separate, independent effects on the display.

Two types of displays arising from the output from a single sensor can be contemplated. The first is an "on-off" display wherein achievement of a minimum level of signal, over a preset threshold, releases a paddle for motion on a video display. The second is a "proportional" display wherein the position of a paddle on a video display is proportional to the intensity of the signal being generated by the body sensor.

The claims of this patent are directed towards combining signals obtained from first and second muscle contractions by processing such signals on the basis of "Boolean anding". Thus the position of a gamepiece within a computer game is controlled on the basis that the user must effect two muscle contractions in order to move the gamepiece on the display. Alternately, one sensor must generate a "null" output for Boolean anding to permit gamepiece movement. Nevertheless, two sensors are always being monitored and their combined outputs release the paddle for motion in an on-off manner.

However, this reference does not teach that the signal strengths from the respective sensors are mixed. It therefore falls short of producing a "composite" output. Rather, Boolean anding only says that the outputs of two sensors have to be monitored in order to achieve action in the video display.

This patent teaches that output signals from body sensors can be adjusted in magnitude so as to size them to fit a video display screen, a process that may be referred to as "calibration" or "normalization". Thus the system can establish upper and lower range limits of signal that fit within the boundaries of the video display screen. The upper and lower limits of the signal from the sensor can be converted to represent a scale from 0 to 100%. The signal presented as the person performs a muscle contraction or movement can thereby be adjusted to fall within this range.

This patent further teaches that an output may be suppressed until a certain threshold level, controlled by a therapist, has been achieved. Movement of the game piece can be made non-responsive unless the person providing the body signal exceeds a selected level of output. This can provide an incentive for effort as, for example, in the case where the threshold is set near the upper limit of a person's capacity.

A therapist can adjust the limits while the patient is engaged in a therapy exercise, i.e. moving the goal posts during the game. Thus this reference observes that as the patient's movements are improved, the settings can be gradually changed to require more effort by the patient in order to achieve a given activation of the cursor on the screen.

Use of a central dead-band has also been established. Thus crossing one of two thresholds would be required to move a cursor right or left, with no cursor motion resulting from a body position within the dead band between the two thresholds. Different sensors can have different limits and different thresholds.

Cursor control can either be based on a position correspondence or a velocity correspondence. Thus, in one embodiment, if the angle formed by elbow were midway between the two extremes, then the game piece position would be midway between the two extreme sides of the display. In another embodiment, the game piece position is set by putting the game piece in motion in a specific direction corresponding to the current position of a body part.

A non-linear correspondence between sensor output and display is proposed as a possibility in Wood. This permits a magnified or de-magnified response in certain ranges. Thus, in some embodiments, cursor movement is not linearly related to body movement. For example, movement in the middle of the range may cause very little corresponding cursor movement while movement towards one extreme or the other of the range may cause a greater amount of corresponding movement in the display. This feature addresses the form of display associated with a single output. It does not address the treatment of multiple outputs to produce a single display.

A further type of pre-existing video display presents the signal values originating from a single force sensor in an X-Y graphic format. The Y direction represents the strength of the signal and the X direction represents time, providing a trace which proceeds across the screen. By scrolling the screen to the left, the leading end of the trace remains continuously present on the screen, while the recent history of the values being presented are shown by the trailing balance of the trace.

As a further feature of this specific pre-existing type of video display, the difference between the output values of two force sensors has also been displayed as a single trace on such screen. Thus a composite signal has been created by subtracting the value of the output from one force sensor from the value of the output from another force sensor. If the object were to train a subject to produce balanced forces on two force sensors, as with dual force pads placed beneath a subject's respective feet, then this difference-based composite trace, when this objective is achieved, would present a steady, horizontal, line having a value of zero on the vertical scale.

U.S. Pat. No. 6,032,530 to Hock is such a case where feedback based upon a differential between signals is provided to an individual who is trying to learn a physical activity. This document refers to separate sensors being combined by providing: "a sensor system for sensing rotational kinetic activity . . . (wherein) . . . The outputs of the sensors are connected differentially for measuring rotation of the section about the axis." While this reference suggests a mixing of signals from two symmetrically placed sensors, this reference does not teach producing a composite output for purposes of a display that provides feedback to a patient in the form of a single indication derived from accumulating values from multiple inputs arising from non-symmetrical muscle sources.

Hock also mentions the case where many transducers may be used:

"While the system works with a single transducer, there may be multiple transducers, with processing circuitry that can integrate multiple inputs and generate a composite result as a function of the multiple inputs.

"However, in the context of the Hock disclosure the composite result he refers to appears to be directed to the production of multiple, discreet and musical notes rather than a true composite signal wherein the feedback provided does not distinguish the signals originating from individual body sensors.

While these various systems represent instances of provision of displays that can serve to provide feedback to a user, the full potential of the composite display concept has not been recognized or adequately exploited. What the prior art references fail to address is an enhanced procedure for effecting an integration of multiple outputs from the sensory-motor system to provide a single output composite display arising from different, non-symmetrical muscle origins. A need exists for a system based upon combining the outputs from two or more such sensors, particularly with the added feature of weighting values provided to such outputs, to produce a single performance-indicating output.

This invention addresses the object of providing a kinesthetic training system that provides guidance and motivation for a trainee through more advanced forms of composite displays.

This invention also addresses the object of providing a kinesthetic training system which progressively exposes a subject to the outputs of two or more sensors. This progressive training methodology goes beyond and is to be distinguished from mere "Boolean anding" in that it provides subjects with a more complex display that serves as a strong incentive for improved physical performance.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims that conclude this Specification.

SUMMARY OF THE INVENTION

The present invention is based on an apparatus for training a subject to perform a specified physical activity or series of physical activities and a process of training said subject.

According to one aspect of the invention, the apparatus comprises two or more body sensors for monitoring a subject's movements. These sensors may be any type of body sensor that can record data that is indicative of a subject's kinesthetic performance arising from different muscular origins and particularly from muscle sources that are not symmetrical to each other. This asymmetrical feature is associated with the object of automatising a movement with several degrees of freedom to provide a display that provides feedback to a patient in the form of a single indication derived from accumulating values from multiple inputs arising from non-symmetrical muscle sources.

The sensors need not be mounted on the user, they may be mounted on equipment used by the user or can be in the form of devices that can sense the user's movements from a distance. Each such sensor produces a sensor output signal indicative of an aspect of the physical performance of the subject.

Also provided by the apparatus is a signal processing means which receives sensor output signals from the two or more body sensors and provides an output which is used to drive the display. The output signals from individual sensors may be "normalized" either by an operator providing input to the signal processing means, or by the signal processing means itself.

According to one variant of the invention this signal processing means generates a single composite signal with a value which is an additive function of the individual sensor output signals originating from independent non-symmetrical muscle sources. The composite signal is preferably formed by adding values based on such individual sensor output signals to produce a single output. This is to be distinguished from simply taking a difference between two signals or adding signals from symmetrically placed sensors to cancel or combine common signal elements to produce the value for the composite signal. In this sense, an "additive" combination is established. Optionally, but preferably, the signal processing means assigns weighting factors in respect to each of the individual sensor output signals before they are combined. After the composite signal is formed, it may itself then be "normalized" by reducing its scale to a range wherein its maximum expected value corresponds to or near the upper limit of the available range for display.

The single composite signal is then provided to a display means, which provides feedback to the user. This feedback is in the form of a display that is generated in response to the single composite signal but is derived from multiple sensor sources. The display itself for the single composite signal does not contain any apparent indication as to the relative contribution of the multiple sensor signals contributing to the composition of the composite signal. An option may, however, be provided to give the trainee an indication of which particular sensor is not within the desired range. This may be a display which is visual, a display which is auditory or any form of display which will communicate to the subject. Visual displays may be in the form of a dial or linear gauge, and the display may be effected through a video terminal. The display may also be in the form of a game piece which can be positioned on the display of a video terminal in response to the value of the composite signal.

In a further aspect, the invention may be effected by providing an apparatus for training a subject to perform a specified physical activity, the apparatus comprising:
a) two or more body sensors for monitoring a subject's movements, said sensors each respectively producing sensor output signals indicative of the kinesthetic performance of the subject;
b) signal processing means connected to receive sensor output signals from the body sensors, said signal processing means comprising means to:
  i. assign weighting factors in respect to each of said individual sensor output signals to produce individual weighted sensor output signals, and
  ii. generate a single composite signal with a value as a function of the individual weighted sensor output signals, and
c) display means connected to said signal processing means to receive said composite signal to provide feedback to the subject in the form of a display that is generated in response to the single composite signal, whereby a subject may receive feedback as to their physical activity.

While it may appear, initially, that a trainee would be confused by feedback in the form of a single composite signal that originates from multiple individual sensors, it has nevertheless been found that a subject can isolate and optimize individual actions that contribute to providing feedback in the form of a single composite display.

Optionally, an operator or therapist in attendance can adjust the manner in which the combined output is produced from the input signals while the patient is actually carrying-out an exercise. This may appear equivalent to the established procedure of moving the "goalposts" during a game, but in accordance with the invention this is effected in a sense different from the prior art. The operator can adjust the correspondence between the body sensors which detect the patient's movements and the composite signal driving the display by changing the weighting applied to specific individual sensor output signals that are being used to produce the composite output. The "goalpost", which is provided for the single composite signal may remain constant. It is the weighted values of the individual sensor signals that may be changed and then combined to form the new composite signal. This can serve to force the patient to further define and control certain aspects of his physical performance in order to achieve a satisfactory output. Optically, the standards for satisfactory output from the display, "the goalposts", appear to remain constant.

Thus, according to one aspect of the invention feedback is generated and provided to the display system in the form of a single, composite output from a plurality of sensors in order to generate a display wherein the composite output includes elements arising from each of the plurality of sensors, some of which may have optionally been modified by weighting factors.

According to another aspect of the invention, a subject pursuing an activity with multiple body motions with the object of developing an improved pattern of motion for one muscle set, including while limiting the activity of another muscle set (avoiding excessive/improper/insufficient motion), is exposed to a training experience that is "progressive". According to this methodology, exercise commences with a single sensor. And then, once training on the single sensor has succeeded, exercise moves-on to training on a second sensor. The first sensor is still operative to suppress output if minimum thresholds or satisfactory values are not being achieved by the first sensor. The output from the first sensor is treated as providing an on-off signal. The output from the second sensor is treated as providing a proportional output. Alternately, the display in this scenario may be driven by a composite signal.

Thus the display, according to this aspect of the invention, may either simply be the output of the second sensor, in proportional mode, or a composite output derived from several sensors. The composite output could be based on the first and second sensors, or if further sensors are employed, from other combinations of sensors.

In accordance with this aspect of the invention, a subject is exposed to the following procedure:

a) providing a first body sensor for monitoring a subject's movements, said first body sensor producing first output signals in response to the performance of the subject;

b) providing signal processing means connected to receive the first output signals and generate a first display control signal with a value as a function of the first output signals;

c) establishing a range of acceptable values for the first output signals produced by the first body sensor;

d) providing display means connected to said signal processing means to receive the first display control signal to provide feedback to the subject in the form of a display that is generated in response to the first display control signal until the subject is able to generate first output signals that fall within the pre-established range of acceptable first output signal values; then e) providing a second body sensor for monitoring the subject's movements, said second sensor producing second output signals in response to the kinesthetic performance of the subject;

f) delivering the second output signals to the signal processing means and generating a second display control signal as a function of the second output signals;

g) providing the second display control signal to the display means to provide feedback to the subject in the form of a display that is proportional to and generated in response to the second display control signal, but only while the first sensor display signal value falls inside the pre-established range of acceptable first output sensor signal values.

Alternately, a method it may be implemented as above but with the last two sub-paragraphs above providing as follows:

f) delivering the first and second output signals to the signal processing means and generating a second display control signal as a composite function of the first and second output signals;

g) providing the second display control signal to the display means to provide feedback to the subject in the form of a composite display that is generated in response to the second display control signal, but only while the first sensor display signal value falls inside the pre-established range of acceptable first output sensor signal values.

This procedure can be carried out by providing an apparatus for training a subject to perform a specified physical activity, the apparatus comprising:

a) a first body sensor for monitoring a subject's movements, said first sensor producing first sensor signals in response to the kinesthetic performance of the subject;

b) a second body sensor for monitoring a subject's movements, said second sensor producing second sensor signals indicative of the kinesthetic performance of the subject;

c) signal processing means connected to receive the first and second sensor output signals from the body sensors, said signal processing means comprising means to:
  i) compare the first sensor signals to a range of pre-established acceptable first sensor signal values, and
  ii) generate a single display control signal with a value as a function of the second sensor signals, and d) display means connected to said signal processing means to receive the single display control signal to provide feedback to the subject in the form of a display that is generated in response to and is proportional to the single display control signal, wherein the signal processing means operates to suppress the single display control signal if the value of the first sensor signals falls outside the pre-established range of acceptable first sensor signal values, whereby the user may receive feedback in the form of a proportional display arising from the single display control signal, but only when the first sensor signal values fall inside the preprogrammed range of acceptable on/off sensor signal values.

Again, as indicated above with respect to the method, the single display control signal may, itself, be a composite signal based on the outputs of two or more individual sensors. On this basis the last sub-paragraphs above may instead provide as follows:

c) signal processing means connected to receive the first and second sensor output signals from the body sensors, said signal processing means comprising means to:
  i) compare the first sensor signals to a range of pre-established acceptable first sensor signal values, and
  ii) generate a single composite display control signal with a composite value as a function of the first and second sensor signals, and d) display means connected to said signal processing means to receive the single display control signal to provide feedback to the subject in the form of a display that is generated in response to the single composite display control signal, wherein the signal processing means operates to suppress the single composite display control signal if the value of the first sensor signals falls outside the pre-established range of acceptable first sensor signal values, whereby the user may receive feedback in the form of a composite display arising from the single display control signal, but only when the first sensor signal values fall inside the preprogrammed range of acceptable on/off sensor signal values.

Further, the composite display control signal may be generated in response to several sensors other than the outputs from the first and second sensors.

In all of the variants of the invention, the individual sensor output signals may optionally be normalized or adjusted through individual gain controls such that they each provide a "normalized" signal that falls satisfactorily within the standard range for the signal processing unit. The signal processing means may then assign additional weighting factors in respect to each of said normalized individual sensor output signals to produce individual weighted sensor output signals, and generate a single composite signal with a value as a function of the individual weighted sensor output signals. That single composite signal may then, in turn, be normalized.

In generating the composite signal, the individual sensor output signals may be combined by the signal processing unit in a variety of ways. For example, the individual sensor output signals may be given equal weight and their values simply added to produce the composite signal. Alternately, differing weighting values may be applied to the respective individual sensor output signals in order to provide a greater or lesser emphasis on certain signals that correspond to body sensors that detect a portion of a movement that the user might be having trouble with. Such weighting values may be based upon the preferences of an operator or may be based upon a predetermined weighting system that is preprogrammed into the sensor signal processing means for a given activity. The processing means, e.g. a programmed computer, may also be preprogrammed to change the weighting values as the exercise activity progresses.

The weighting factors provided to the signal processing means may be changed by an operator in order to shift the focus for the user on certain physical activities. An operator might also change the algorithm itself in order to vary the manner in which the composite signal is generated. The process of changing the weighting factors or the algorithm may optionally be performed in real time while a user is performing a series of repetitions of an activity. This changing of the variables is especially desirable when a user has mastered one or more components of an action but continues to struggle with the remaining components.

For example, the user might initially be provided with two sensors whose individual sensor output signals are given the same weighting factor and are additively combined to provide the composite signal: Composite signal=1a+1b. The user would repeatedly practice a motion while being given feedback as to the success of that motion. Eventually, the user might become very proficient in one of the motions (for example, the motion related to the "a" signal) but not the other. In this case, the operator would decrease the weighting factor of the "a" signal with respect to the weighting factor of the "b" signal. The algorithm for the composite signal in this case might become: Composite signal=0.75a+1b. Preferably, the composite signal would then be re-normalized. This would then require that, in order for the user to produce the same composite output signal as was produced with the initial weighting factors, the action related to the "b" signal would need to be performed with a greater degree of proficiency, e.g. effort. This is done through providing greater importance of the action related to the "b" signal. Thus the focus, for the user, would become more oriented towards the "b" signal.

It may also be desirable to provide a blocking or suppression function that is incorporated into the algorithm generating the comparison signal in order to suspend feedback when either individual sensor signals or the composite signal fall within a respective range designated as a "dead zone". This would be equivalent, for example, to being below a minimum threshold, for a specific signal. One or more "dead zones" may be provided in respect to each of the sensor signals. When one or more of the individual sensor signals and/or the composite signals fall into a "dead zone", the feedback would be suppressed. This would constitute a kind of "on-off" filtering.

An example would be suppressing the display originating from the composite signal based on training to carry out a tennis stroke that relies on signals from both shoulder and wrist body sensors. The display based upon the composite signal would be suppressed if the wrist extension past 30° is not complete.

A further example would be based on the user's movements producing a display derived from multiple signals that each produce outputs that fall within the respective, acceptable, sensor value ranges. While this is occurring, that is when all desired signals are above their respective thresholds, feedback is provided which is proportional to the composite output of the movement. However if one component falls outside of the desired range, no display is provided.

The feedback means may be in the form of a video game display. In the example of the game "Pong", when the user generates acceptable values for the desired signal(s), the paddle can begin to move slowly, moving towards one end of the screen. User control can be limited to simply releasing the paddle for movement i.e. on-off control. This is to be contrasted with the case where the velocity of movement may be proportional to the composite signal. In the threshold control mode, once the display driving signal surpasses the threshold established for the composite signal, the game piece moves at a predetermined speed. The 'correctness' of the movement, in this case, affects the persistence of moving the game piece.

Alternately, by varying the quality demanded of the desired movement, i.e. the effort or range of motion, the speed of the paddle may be changed. This would constitute a proportional display. In the proportional mode of control, movement within the display based upon the driving signal is more responsive to the effort being made by the user.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1A:
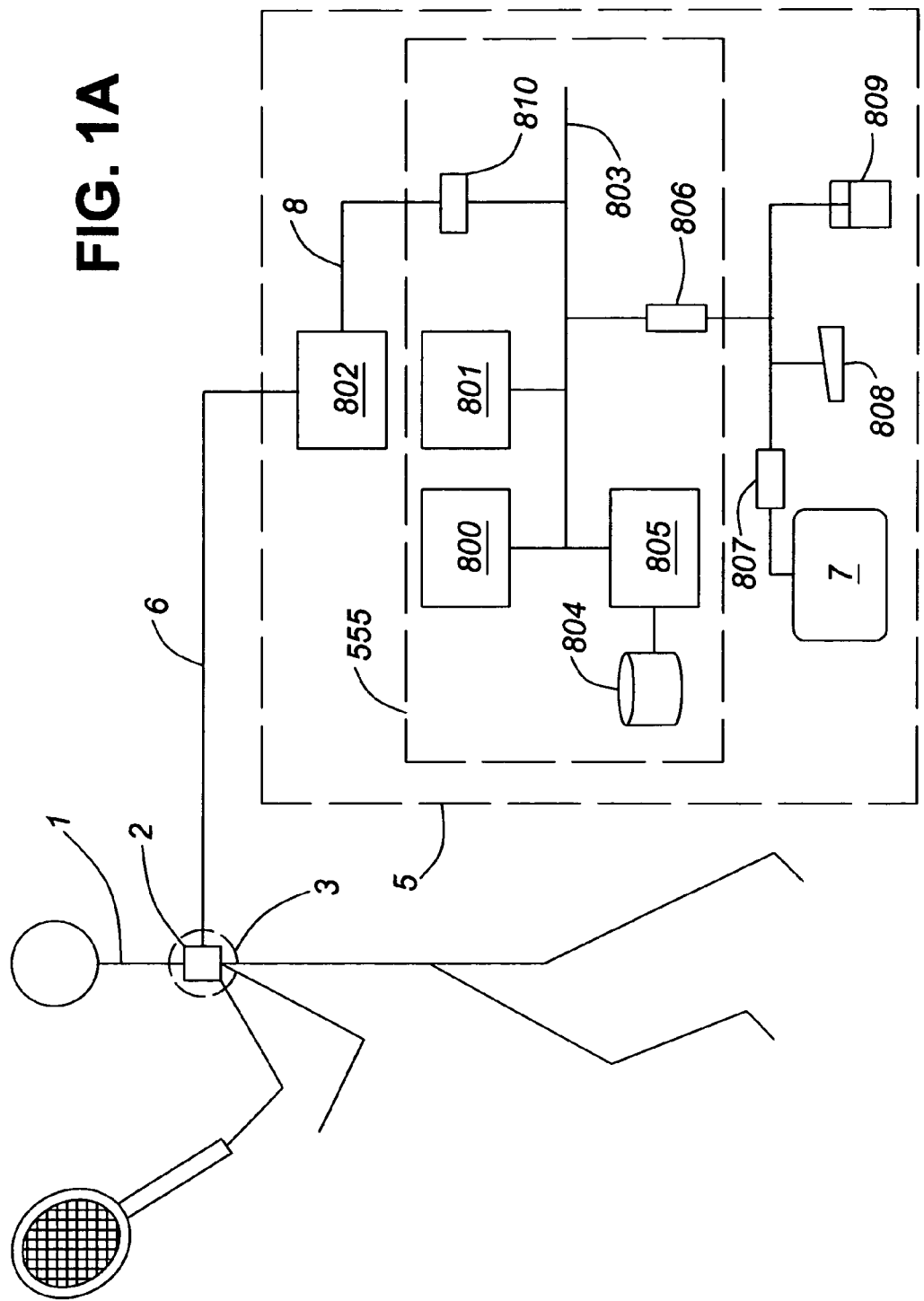
FIG. 1A depicts a subject training for performing a desired movement in the game of tennis whose shoulder sensor is coupled through a signal processor to a video display.

FIG. 1A depicts a subject 1 training for performing a desired movement related to, for example, the game of tennis. The subject 1 is provided with an electromyographic (EMG) sensor 2, disposed on the subject's shoulder area 3. This sensor 2 provides an electrical signal generated by the contraction of muscles, an electromyographic signal arising in the shoulder area 3 of subject 1. The EMG sensor 2 can be provided with a preamplifier (not shown) for pre-amplifying the EMG sensor signal in order to provide an electrical signal sufficiently strong to be fed to a signal processing means 5 via communication line 6.

As shown in FIG. 1A, the signal processing means 5 may include a personal computer system (PC) 555 having a central processing unit (CPU)-805 coupled via bus 803 to memory 801, interface port 810, disk controller 805 and input/output controller 806. The disk controller 805 is coupled to storage device 804 and the interface port 810 is coupled to interface 802 via communication line 8. The input/output controller 806 is coupled to video controller 807, which is in turn coupled to a display means such as video monitor 7, referred to as a "display" or "display means". The input/output controller 806 is also coupled to keyboard 808 and pointing device 809.

Figure 1B:
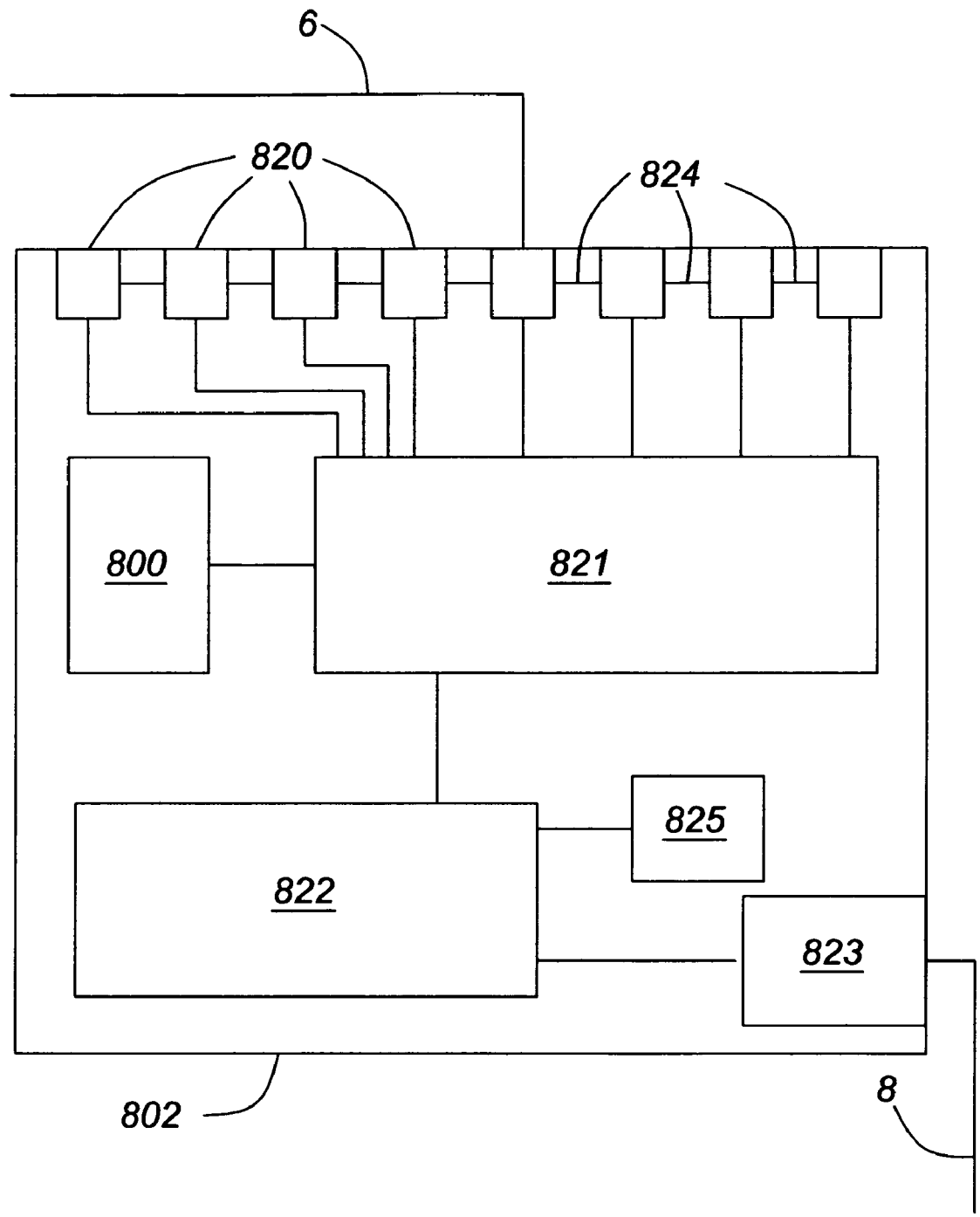
FIG. 1B is a partial schematic of a portion of the signal processor of FIG. 1A.

As seen in FIG. 1B, interface 802 may include a series of sensor ports 820 connected to an analog-to-digital (A/D) converter 821 which is in turn connected to a microprocessor 822. The microprocessor 822 is connected to a port 823 which may be a USB port. Port 823 is connected to PC 555 through communication line 8. EMG sensor 2 is connected to one of the sensor ports 820 through communication line 6. Interface 802 may also include an interface memory 825 connected to microprocessor 822.

Figure 1C:
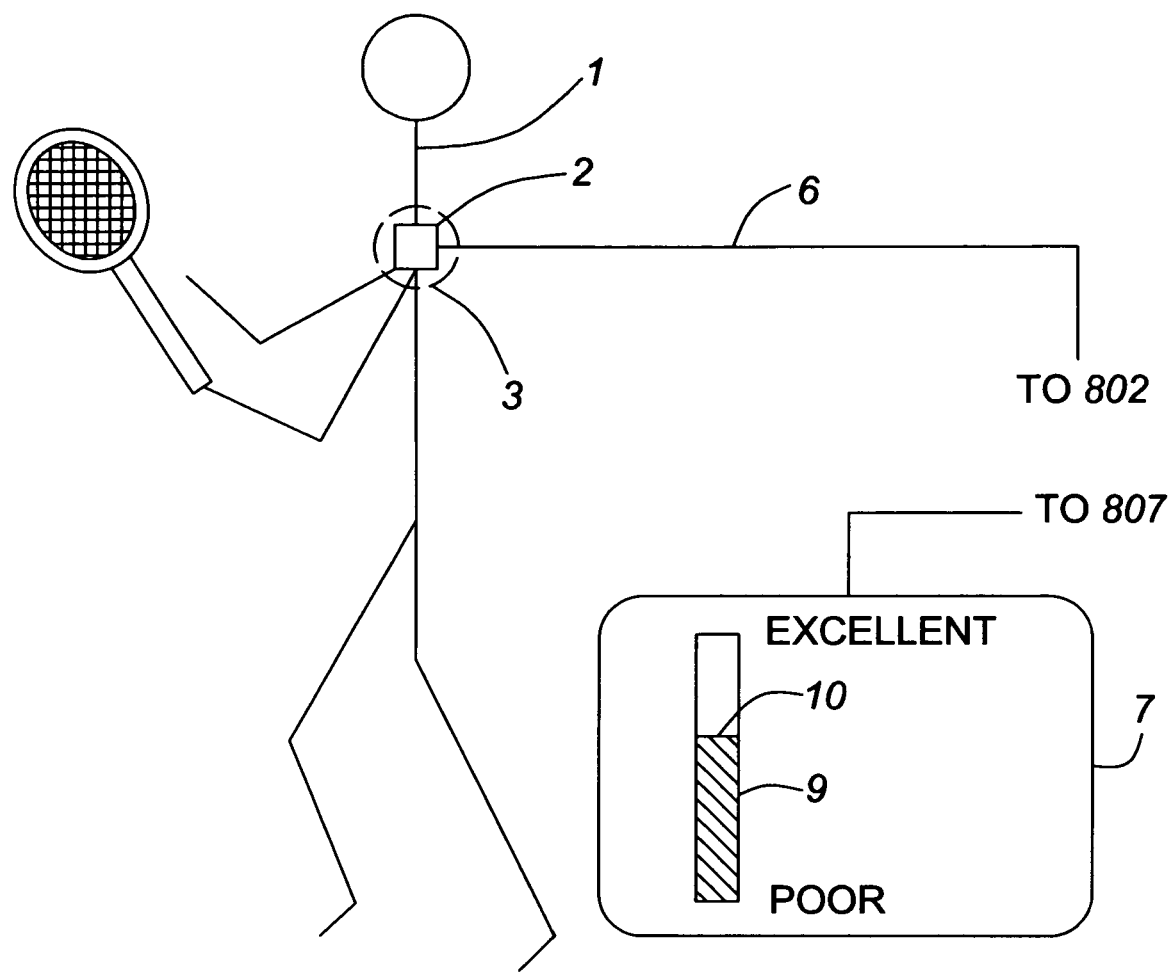
FIG. 1C is a schematic depiction of the subject of FIG. 1A generating a scalar display as to his performance effort arising from the shoulder sensor.

A first instruction set residing in storage device 804 and/or memory 801 allows PC 555 to communicate to interface 802 through interface port 810. The first instruction set, together with a second instruction set residing in interface 802, allows the signal processing means 5 to determine the EMG signal level provided by EMG sensor 2. The instruction sets may further allow subject 1, or a trainer, to set specified ranges. The specified ranges are used by the signal processing means 5 to determine to which of the specified ranges the EMG signal level corresponds. The first and/or second instruction set further allows for the provision of a comparison signal, the level of which will be dependent on the specified range, to which the EMG signal level corresponds. This comparison signal is provided to video monitor 7 through video controller 807 in order for the video monitor 7 to provide a visual feedback signal to subject 1. The visual feedback signal may be in the form of a performance bar 9 as illustrated in FIG. 1C.

This performance bar 9 relates to the passage of time in two aspects. In a first aspect, the signal provided by a body sensor can vary during the execution of the procedure which the subject 1 is being trained to perform. Thus sensor 2 can generate an output signal that has a value or waveform, which varies over time. This waveform is defined within the interval required for the complete execution of the desired movement. The performance bar 9 can represent the instantaneous performance value of this output signal, the maximum level achieved or the average over a selected interval, as well as other variations.

In a second aspect, the performance of the subject 1 can, and normally will, change with repetitions of the action. In this case, the passage of time is divided into multiple intervals with each interval corresponding to the output waveform arising from one repetition of the desired action.

Furthermore, over multiple intervals, the performance of subject 1 will pass through stages corresponding to making progress towards optimum performance. These stages can be associated with ranges of values for the output signal being provided by the body sensor. The performance bar 9 can represent advancement in the level of performance over multiple repetitions, for example, by preserving a maximum value for a subject to exceed on a further attempt.

Whether the performance bar is presenting the instantaneous performance value, the maximum level achieved, or the average over a selected interval, including preserving a maximum value for a subject to exceed on a further attempt, its value can be set by the output of the composite signal generated by the invention, as described further below.

Figure 2:
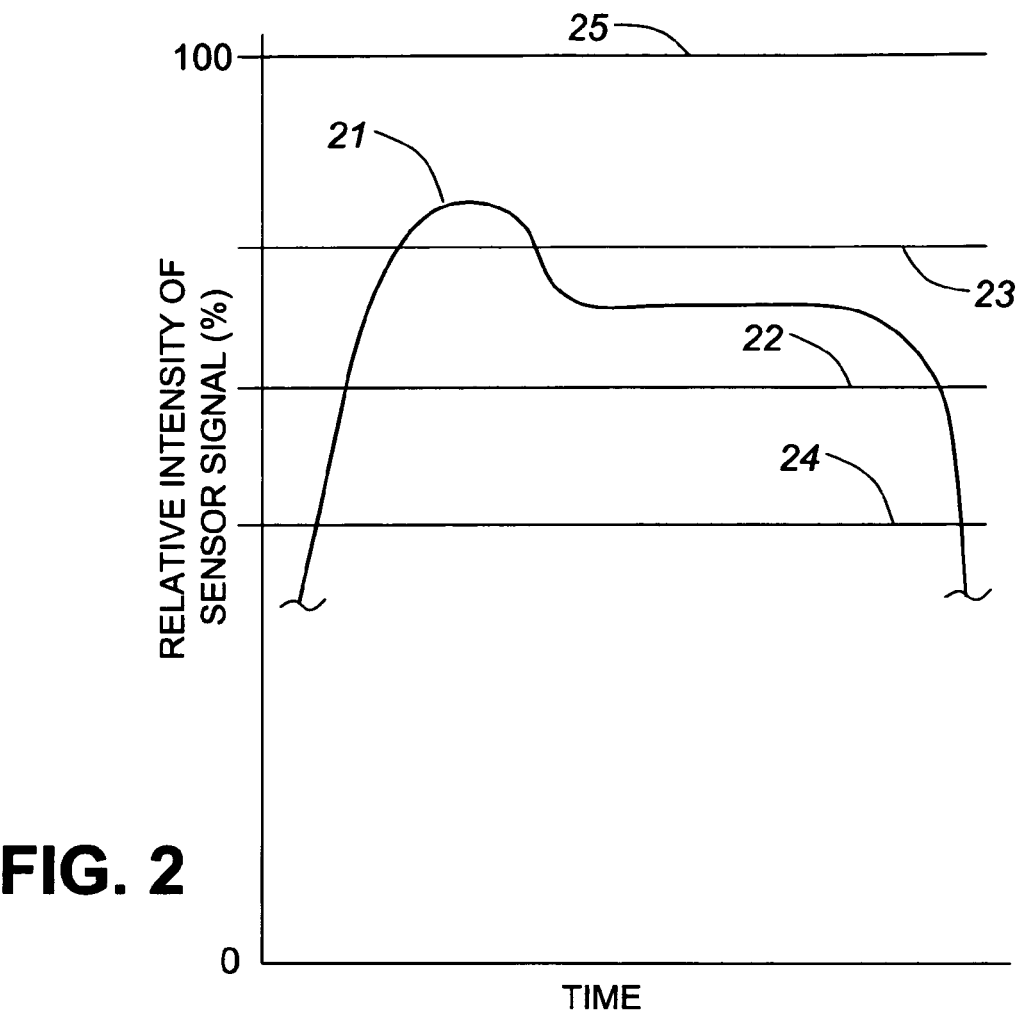
FIG. 2 is a graph showing the performance effort of the subject of FIG. 1C as a function of time.

FIG. 2 shows a graph of relative intensity of the EMG sensor signal 21 with respect to a time scale that shows progressive stages of performance. Initially, the shoulder muscle is excessively contracted above the minimum desired threshold 22 to beyond a maximum desired level 23, and then the shoulder muscle maintains a relatively constant level of effort for the period indicated. Through the first and/or second instruction set, the signal processing means 5 may be adjusted by a trainer, or by subject 1, in such a way that when EMG sensor signal display 21 is within a first specified range comprised, for example, between levels 22 and 23, the corresponding output to the display signal 21 on the video monitor 7 will be such that performance bar 9 of FIG. 1C would indicate a performance level 10 at the "excellent" level.

When subject 1 does not sufficiently contract the muscles in the shoulder area 3, i.e. not within the satisfactory performance band 22, 23 as shown, then performance bar 9 would indicate a performance level 10 situated between "poor" and "excellent" (this is the exemplary scenario depicted in FIG. 1C). The performance bar 9 would indicate a similar decreased performance level 10 in the case where the subject 1 excessively contracts muscles in shoulder area 3 and generate an EMG sensor signal 21 comprised above level 23, and therefore outside of the region of acceptance performance.

Thus, levels 22 and 23 represent thresholds bounding the "On" region there between, and the regions between levels 24 and 22 and between 23 and 25 can represent "dead zones". A subject 1 or a trainer can specify the values for these levels and EMG sensor signal level ranges associated with each specified range of performance level. In this manner the signal processing means 5 may be adjusted to provide a display signal to the video monitor 7 commensurate with the performance level.

As the subject 1 becomes better at performing a contraction of the muscles of shoulder area 3, the width of the specified ranges may be narrowed, thereby further training subject 1 to perform a more precise muscle contraction. The width of the specified ranges could be modified manually via a programming interface. Additionally, the software within the personal computer PC 555 can be programmed to have the width of the specified range vary automatically after subject 1 performs a certain number of contraction of the muscles of shoulder area 3 or achieves a preset level of performance.

Figure 4:
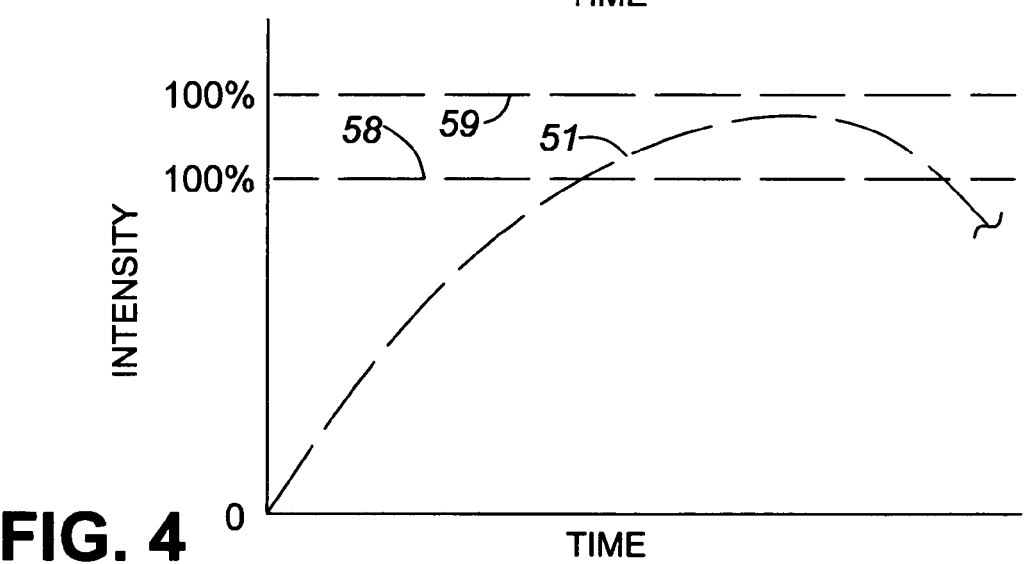
FIG. 4 is a graph showing the performance effort of the subject of FIG. 3 as a function of time derived from the second sensor present on the hip of subject of FIG. 3.
Figure 3:
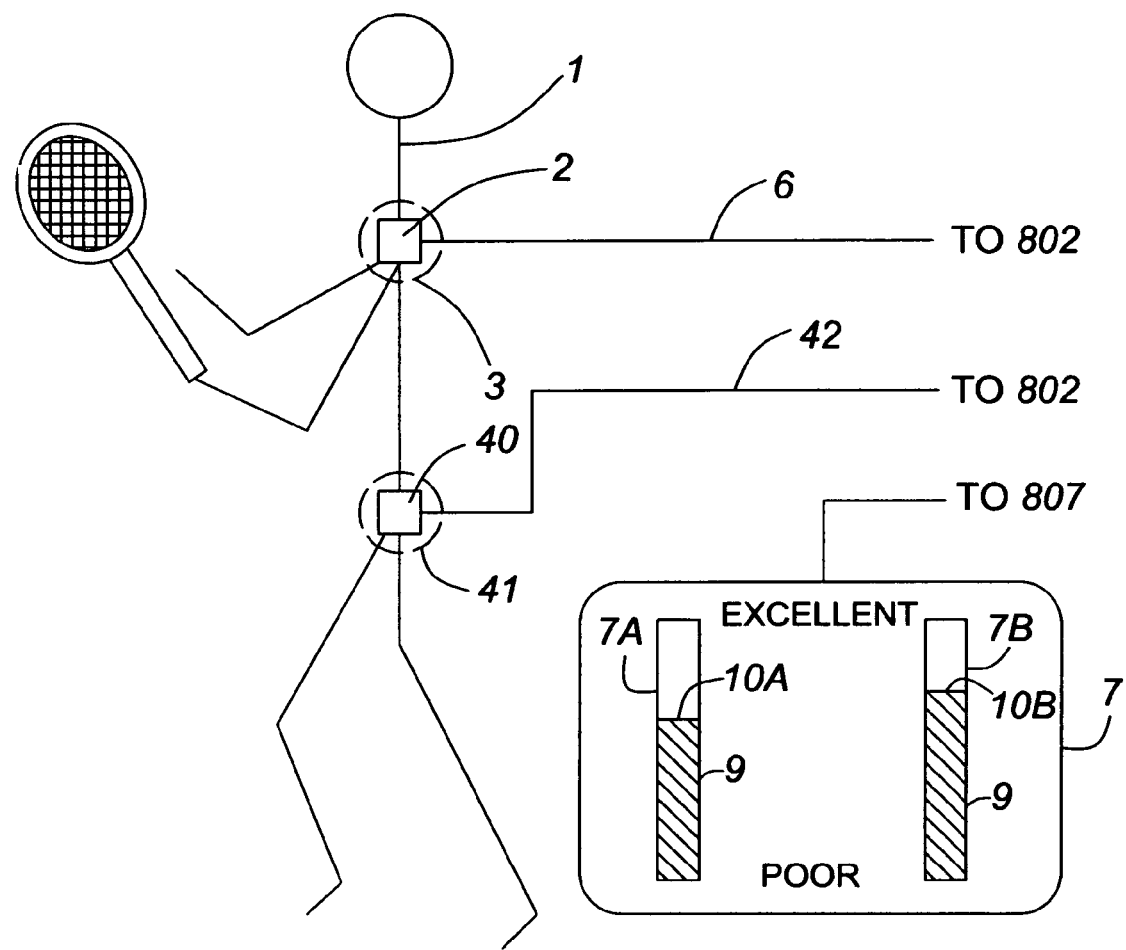
FIG. 3 is a schematic depiction similar to FIG. 1C but wherein the subject is provided with two body sensors, one for the shoulder and one for the hip, providing two display signals.

FIG. 3 depicts a scene where subject 1 is again training for performing a desired movement related to the game of tennis. However, in addition to having an EMG sensor 2 disposed on the shoulder area 3, subject 1 has a rotation sensor 41 disposed or fitted to hip area 40. The rotation sensor 41 could be an accelerometer such as Endevco's Model 7269 or Assemtech's ETS90SS. The rotation sensor 41 detects a rotation of the hip area 40 with respect to the base of support of subject 1. The sensor 41 then provides an electrical signal indicative of the hip rotation to the signal processing means 5 via a communication line 42 connected, as communication line 6, to one of the sensor ports 820. FIG. 4 provides a graphic display for this output, similar to FIG. 2 wherein an optimal specified range for rotation sensor signal 51 has a lower limit depicted by level 58 and an upper limit depicted by level 59.

In this case, where the subject 1 is equipped with an EMG sensor 2 and a rotation sensor 41, the signal processing means 5 could process both signals provided by the EMG sensor 2 and the rotation sensor 41 to provide at or for a given moment in time two bar-graph displays, 7A, 7B showing respect of performance levels 10A, 10B. However, the bar graphs do not show the coordination of these two movements over time.

Figure 5:
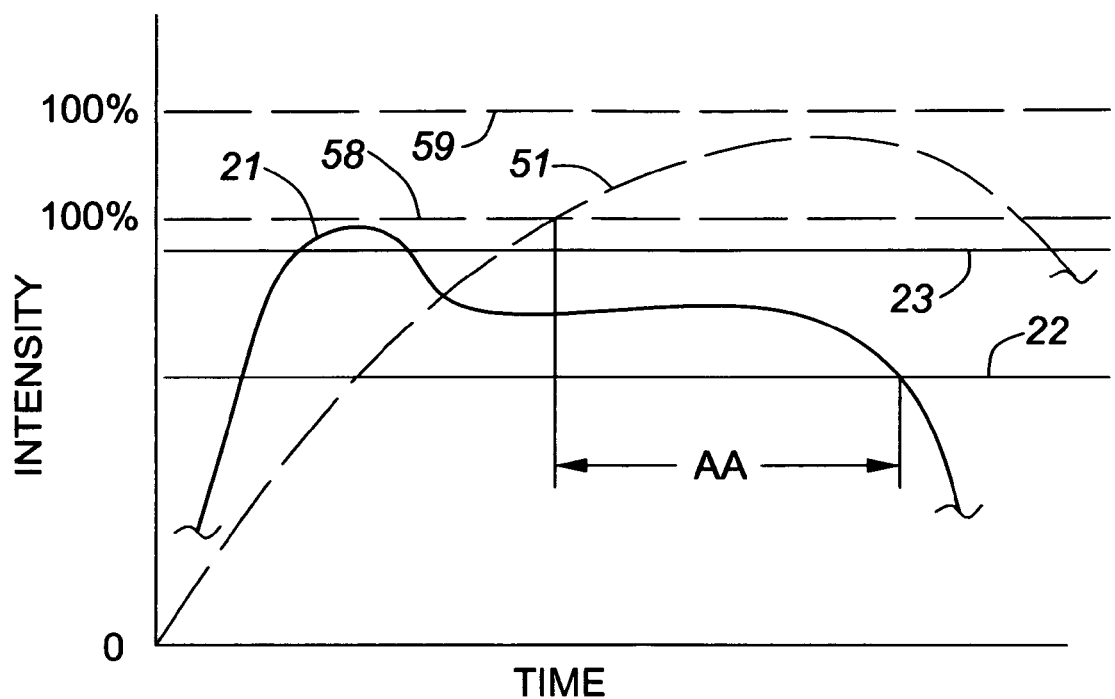
FIG. 5 is a graph of a type that may optionally be presented to a user wherein the two sensor outputs of FIGS. 2 and 4 are overlaid on the same graphic presentation.

Allowing for signal output variation over time, FIG. 5 shows a graph of the relative intensities both of EMG sensor signal display 21 and rotation sensor signal display 51 with respect to a progressive time scale. The signal for trace 51 in FIGS. 4 and 5 shows the value for the rate of angular rotation of the hips during the exercise. This rate builds up to a maximum during the swing and, for a short interval AA, the satisfactory higher rate of hip rotation of trace 51 (between limits, 58 and 59) corresponds with the satisfactory level of effort being made by the shoulder muscles trace 21 (between limits 22 and 23).

Figure 6:
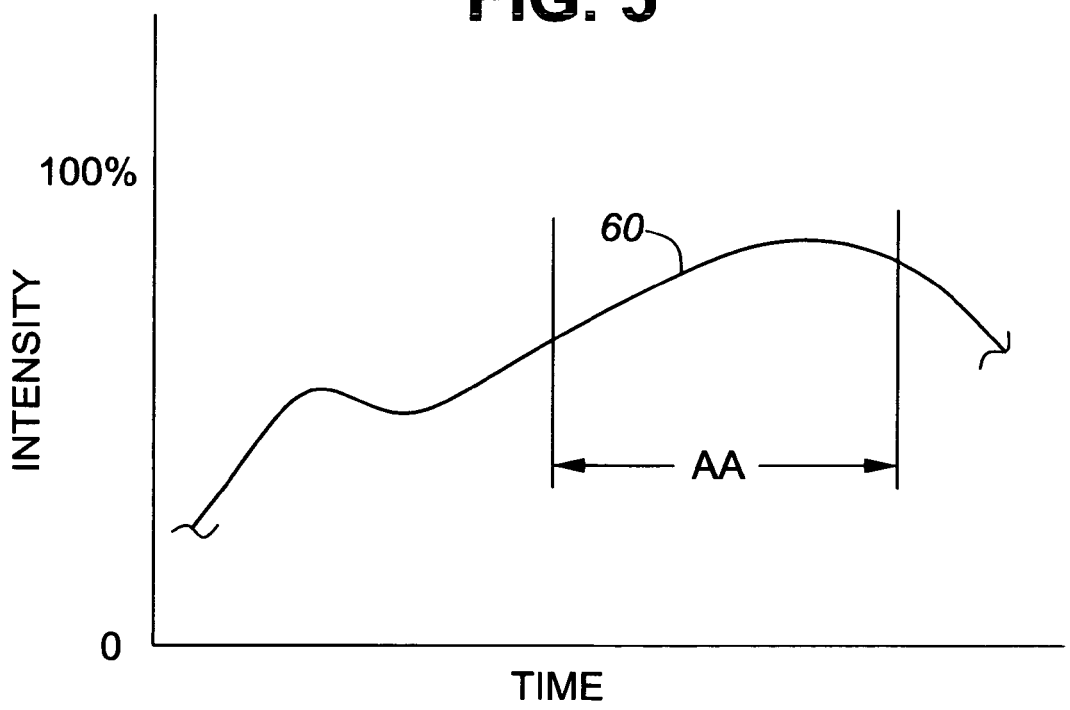
FIG. 6 illustrates an embodiment of the present invention wherein the outputs of the sensors of FIGS. 2 and 4 are combined additively to produce a composite output, displayed as a graphic curve which is a function of time, for presentation to the user according to the invention either directly or through an alternate display.

The signal processing means 5 may be adjusted by a trainer, or by subject 1, through the first and/or second instructions sets mentioned above, in such a way as to provide to the video monitor 7 a composite comparison signal 60, cf FIG. 6, which is derived, for example, by adding both EMG sensor signal 21 and rotation sensor signal 51. This composite signal 60 may then be normalized for presentation.

Consequently, the curve for the trace 21 in FIG. 5 represents the case where subject 1, as in FIG. 2, initially over-contracts and then optimally contracts the muscles of shoulder area 3 (between specified levels 22 and 23). At the same time, the subject is slowly building-up rotation of the hip area 40 into a satisfactory speed range (between specified levels 58 and 59). The values for these two traces, 21, 51 can be additively combined to produce a composite signal trace 60, shown in FIG. 6.

In the case where the EMG signal 21 and the rotation signal 51 are both in their respective optimal ranges—during interval AA—, the composite comparison signal 60 shown in FIG. 6, which, for the purposes of this demonstration is taken to be a relative signal normalized to near its highest possible value, will have an intensity of nearly 100%. Optionally, a further performance bar similar to those in FIG. 3 but showing composite performance could be presented to the subject. For the interval AA the performance level of the composite performance bar would indicate "excellent".

Such a combined performance bar as in FIG. 3, which corresponds to the composite signal 60, can provide feedback to subject 1 regarding the subject's combined performance in the contraction of the muscles of shoulder area 3 and in achieving a rate of rotation of hip area 40.

Alternately, video monitor 7 can display the graph of FIG. 6, presenting the composite graphic to the subject 1 indicating the achievement of successful performance. In this display, the trace in the region AA can be distinguished by highlighting, or the balance of the trace can be suppressed on the basis that either trace 21 or trace 51 is in a "dead zone". Optionally, other traces 21, 51 can be provided with reduced highlighting.

Where a gaming display is used to motivate the user, the achievement of successful performance in terms of acceptable values for the composite display signal 60 can be used to advance the subject's participation in the game. While either of the traces 21 or 51 is in a dead zone, the game piece can be non-responsive. Where a game acts in response to a scalar value, such value may be derived from the intensity or level of the composite trace 60.

While FIG. 6 shows the display of a composite signal 60, this display could also be based on the proportional output 51 of rotational sensor 41. This display can be made conditional on the output 21 of EMG sensor 2 being in the acceptable region 23, 24 as an "off-on" condition. This mode of display may be adopted once the subject has mastered the motion associated with EMG sensor 2.

In the foregoing example depicted in FIG. 6, the values for the outputs of the two sensors 2, 40 were simply added to produce the values for the trace 60. The generation of the single composite signal in accordance with the invention may be based upon algorithms which are novel in the way that they mix inputs from individual sensor output signals. The following is an example of how such an algorithm can be applied to the invention.

A stroke in tennis (e.g., a forehand stroke) requires a weight shift forward. This can be detected by a pressure sensor "a" in a footpad placed under the participant's forward foot. It also requires a trunk rotation which may be detected by a horizontal rotation sensor "b" mounted on their belt. Additionally, it requires a wrist deviation "c" which may be detected by the EMG sensor attached to a specified muscle associated with such wrist deviation. And finally, such motion may require a wrist extension of over 60 degrees, a motion which may be detected by a goniometer "d". In the latter case, the "zero-point" for the angular orientation may be established as the orientation of the wrist determined at the stage of the full wrist extension where the action to be trained begins.

Assuming the most important element to be presented to this particular individual for learning is the trunk rotation, then the relevant algorithm could be:

$$\text{Composite signal} = \tfrac{3}{4}a + 2b + c + d$$

This composite signal is then used to provide a display to the person being trained. Receiving feedback from the composite signal, the participant endeavors to generate an output that corresponds with the optimum output as predetermined by the operator. The user can be motivated to go through the motion while being coached by the operator/technician who might be adding one element at a time to ease and graduate the learning process.

Each time the user goes through the motion, he endeavors to produce a composite signal which more nearly achieves the ideal level which is predetermined by the operator, by preset norms, or by the computer system.

Meanwhile, the operator, if present for assisting in this exercise, has a visible display for each of the individual parameters that are contributing to the formation of the composite signal. The operator has control over the weighting factors that are being applied to each of the individual sensor outputs.

Additionally, the operator can help teach a complex movement with several degrees of freedom by establishing upper or lower thresholds, essentially defining "dead zones"

for each contributing sensor. One or more dead zones may be provided in respect of one or more of the independent sensor signals as well as in respect to the composite sensor signal. If one or more independent sensor signal(s) falls outside the range of acceptable values (which can be above, below or inside the indicated zone), then, according to one variant, no composite signal at all is provided to the display. This threshold/dead zone feature in a "veto" format serves as an indication to the player that he/she is deviating substantially from the correct form of behavior with respect to that particular sensor associated with the dead zone limitation. The establishment of changes to such thresholds/dead zones can occur during training under the control of the operator. Such changes can also be automatically implemented by the software provided with the signal processing means. For example, the software can effect an 'automatic adjustment' for a particular sensor by changing the threshold or dead zone if the percentage of hits in, say, the first 10 attempts is within 20% of the ideal target value. In this manner, an automatic system can be established for scaling the feedback system to suit the abilities of the patient or subject being trained.

The process of adding one element at a time to the display provided to the trainee is an important contribution to the learning process. By training one single motion at first, (in the previous example the proper shifting of the weight to the forward foot detected by the pressure sensor "a", for example), the patient is able to determine the motion required to obtain a satisfactory score on the display when only that motion is considered. In the current example, the algorithm that controls the composite signal would initially be:

Composite signal=$a$

The user would perform the required motion repeatedly, while obtaining feedback on the success of that single motion. Once the patient has mastered this movement, the technician might decide to add the required trunk rotation movement to the system. By placing the horizontal rotation sensor "b" on the patient's belt, the trainee is then able to master this secondary motion while still being required to perform the first. In this case, to add increased importance to the trunk rotation (since the patient has already become partially skilled at shifting his weight to his forward foot), the algorithm might be something like:

Composite signal=$0.5a+2b$

The signals may be added (and weighted if so desired) until all necessary motions are integrated. The final algorithm might be something like Composite signal=$0.75a+2b+c+0.5d$ where c is a wrist deviation which may be detected by the EMG sensor attached to a specified muscle associated with such wrist deviation and d is a goniometer indicating the degree of wrist extension.

The operator can establish thresholds or introduce a dead zone in respect of one or more of the individual sensors or even in respect to the composite signal. If a sensor signal value with "veto" power falls beneath a selected lower threshold, above a selected upper threshold, or in its dead zone, then according to one variant of the invention, no composite signal at all is provided to the display.

By continuing with the aforementioned tennis scenario, a wrist extension of over 60 degrees may be necessary in order to perform the desired stroke. In this case, a motion, which may be detected by a goniometer "d", and a threshold may be provided such that in order for the display to be activated, the value for the goniometer "d" must be above 60 degrees. If a moving paddle within a video game display provides the feedback, then the value for "d" would need to exceed its assigned threshold in order to move the paddle in the game. In this case, the algorithm for the composite signal might include the combined limitations:

If d<60,

Composite signal=0

If d>60,

Composite signal=$0.5a+2b+c+d$

The operator may even provide multiple thresholds for the "dead zones" of a single sensor signal, or one or more thresholds for different signals. It is useful to add a "dead zone" to the range of motion in which a user might damage himself. If the previous example is used, it might be said that a wrist extension measured by the goniometer "d" above 90 degrees is dangerous. In this case, the algorithm for the composite signal might be:

If d<60 or d>90,

Composite signal=0

If d>60 and d<90,

Composite signal=$0.5a+2b+c+d$

The case might arise where the algorithm could require that the composite signal must fall below or above a given threshold. In this case, the algorithm might be:

If Composite signal<threshold, composite signal output=0

If Composite signal>threshold

Composite signal output=$0.5a+2b+c+d$

The composite signal may be used by the signal processing means and feedback means to provide feedback to the user in many ways. For example, a display means whereby "off-on" feedback is provided to the user when the user's movements produce a composite signal that falls within the acceptable range. In this case the feedback is only an indication of whether or not all of the desired sensor signal values fall within the established acceptable sensor value ranges.

Where the feedback means is a video game this procedure may serve to provide "off-on" control as follows. In the example of the game "Pong", when the user's efforts produce signals which fall within the acceptable value range for the desired signal(s), the paddle will move with a constant speed towards one end of the screen. When the user's effort does not fall within that range—the paddle may move automatically with constant speed back towards the opposite end.

Alternately, the strength of the composite signal may control the location of the paddle on the video display. A level of strength over a certain value could move the paddle in one direction, and a level of strength below that value could move the paddle in the other direction. Or the value of the composite signal may produce a proportional display wherein the location of the paddle is determined proportionally to the strength of the composite signal between zero and maximum composite signal.

On this basis, it will be seen that a new and useful means can be established for providing feedback to users in the rehabilitation and physical training fields so that they may integrate or tie together and automate various aspects of a movement.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property or privilege is claimed are defined as follows:

1. An apparatus for training a subject to perform a specified physical activity, the apparatus comprising:
   a) two or more body sensors for monitoring a subject's movements arising from different, non-symmetrical muscular origins, said sensors each respectively producing sensor output signals indicative of the kinesthetic performance of the subject;
   b) signal processing means connected to receive sensor output signals from the body sensors, said signal processing means comprising means to generate a single composite signal with a value as an additive function of the individual sensor output signals,
      i) wherein the signal processing means assigns weighting factors to each of said individual sensor output signals to produce individual weighted sensor output signals, and
      ii) generates the single composite signal with a value as a function of the individual weighted sensor output signals, and
   c) display means connected to said signal processing means to receive said composite signal to provide feedback to the subject in the form of a display that is generated in response to the single composite signal,
   whereby a subject may receive feedback as to their physical activity.

2. An apparatus as in claim 1 wherein the signal processing means:
   a) establishes a range of acceptable sensor values for each of the individual sensor output signals, which acceptable sensor values are above or below respective pre-established lower or upper threshold values, and
   b) detects whether one or more of the individual sensor output signals falls within the range of acceptable sensor values,
   the signal processing means operating to provide that the feedback to the user is suppressed if any of the individual sensor output signal values falls outside the range of acceptable values.

3. An apparatus as in claim 1 wherein the signal processing means:
   a) establishes a range of acceptable sensor values for each of the individual sensor output signals, which acceptable sensor values are above or below respective pre-established lower or upper threshold values, and
   b) detects whether one or more of the individual sensor output signals falls within the range of acceptable sensor values,
   the signal processing means operating to provide that the feedback to the user is suppressed if any of the individual sensor output signal values falls outside the range of acceptable values.

4. An apparatus as in claim 1 wherein the display that is generated in response to the single composite signal is a display that is proportional to the value of the composite signal.

5. An apparatus as in claim 1 wherein the display that is generated in response to the single composite signal is a display that is proportional to the value of the composite signal.

6. An apparatus as in claim 2 wherein the display that is generated in response to the single composite signal is a display that is proportional to the value of the composite signal.

7. An apparatus as in claim 3 wherein the display that is generated in response to the single composite signal is a display that is proportional to the value of the composite signal.

8. A method for training a subject to perform a specified physical activity comprising:
   a) providing a first body sensor for monitoring a subject's movements, said first body sensor producing first output signals in response to the performance of the subject;
   b) providing signal processing means connected to receive the first output signals and generate a first display control signal with a value as a function of the first output signals;
   c) establishing a range of acceptable values for the first output signals produced by the first body sensor;
   d) providing display means connected to said signal processing means to receive the first display control signal to provide feedback to the subject in the form of a first display that is generated in response to the first display control signal until the subject is able to generate first output signals that fall within the pre-established range of acceptable first output signal values, then discontinuing said first display and,
   e) providing a second body sensor for monitoring the subject's movements, said second sensor producing second output signals in response to the performance of the subject;
   f) delivering the second output signals to the signal processing means and generating a second display control signal as a proportional function of the second output signals;
   g) providing the second display control signal to the display means to provide feedback to the subject in the form of a second display that is proportional to and generated in response to the second display control signal, but only while the first sensor display signal value falls inside the pre-established range of acceptable first output sensor signal values.

9. An apparatus for training a subject to perform a specified physical activity, the apparatus comprising:
   a) a first body sensor for monitoring a subject's movements, said first sensor producing a first sensor signal in response to the kinesthetic performance of the subject;

b) a second body sensor for monitoring a subject's movements, said second sensor producing a second sensor signal indicative of the performance of the subject;
c) signal processing means connected to receive sensor output signals from the body sensors, said signal processing means comprising means to:
   i) compare the first sensor signal to a range of pre-established acceptable first sensor signal values,
   ii) generate a single display control signal with a value as a proportional function of the second sensor signal, and
   iii) suppress the single display control signal if the value of the first sensor signal falls outside the pre-established range of acceptable first sensor signal values,
d) display means connected to said signal processing means to receive the single display control signal to provide feedback to the subject in the form of a display that is generated in response to the single display control signal,
whereby the user may receive feedback in the form of a proportional display arising from the single display control signal, but only when the first sensor signal value falls inside the preprogrammed range of acceptable on/off sensor signal values.

10. An apparatus for training a subject to perform a specified physical activity, the apparatus comprising
   a) a first body sensor for monitoring a subject's movements, said first sensor producing a first sensor signal in response to the kinesthetic performance of the subject;
   b) a second body sensor for monitoring a subject's movements, said second sensor producing second sensor signals indicative of the performance of the subject;
   c) signal processing means connected to receive sensor output signals from the body sensors, said signal processing means comprising means to:
      i) compare the first sensor signal to a range of pre-established acceptable first sensor signal values,
      ii) generate a composite signal with a value as a function of the first and second sensor output signals, and
      iii) suppress the composite signal if the value of the first sensor signal falls outside the pre-established range of acceptable first sensor signal values, and
   d) display means connected to said signal processing means to receive said composite signal to provide feedback to the subject in the form of a display that is generated in response to the single composite signal,
   whereby the user may receive feedback in the form of a display arising from the composite signal, but only when the first sensor signal value falls inside the preprogrammed range of acceptable on/off sensor signal values.

11. A method for training a subject to perform a specified physical activity comprising:
   a) providing a first body sensor for monitoring a subject's movements, said first body sensor producing first output signals in response to the kinesthetic performance of the subject;
   b) providing a signal processing means connected to receive the first output signals and generate a first display control signal with a value as a function of the first output signals;
   c) establishing a range of acceptable values for the first output signals produced by the first body sensor;
   d) providing display means connected to said signal processing means to receive the first display control signal to provide feedback to the subject in the form of a first display that is generated in response to the first display control signal until the subject is able to generate first output signals that fall within the pre-established range of acceptable first output signal values, then discontinuing said first display and,
   e) providing a second body sensor for monitoring the subject's movements, said second sensor producing second output signals in response to the performance of the subject;
   f) delivering the second output signals to the signal processing means and generating a composite signal with a value as a function of the values of the first and second output signals;
   g) providing the composite signal to the display means to provide feedback to the subject in the form of a second display that is proportional to and generated in response to the composite signal, but only while the first sensor display signal value falls inside the pre-established range of acceptable first output sensor signal values.
   whereby the user may receive feedback in the form of a display arising from the composite signal, but only when the first sensor signal value falls inside the preprogrammed range of acceptable on/off sensor signal values.

12. An apparatus for training a subject to perform a specified physical activity, the apparatus comprising
   a) a first body sensor for monitoring a subject's movements, said first sensor producing a first sensor signal in response to the kinesthetic performance of the subject;
   b) second and third body sensors for monitoring a subject's movements, said second and third sensors producing second and third sensor signals indicative of the performance of the subject;
   c) signal processing means connected to receive sensor output signals from the body sensors, said signal processing means comprising means to:
      i) compare the first sensor signal to a range of pre-established acceptable first sensor signal values,
      ii) generate a composite signal with a value as an additive function of the second and third sensor output signals, and
      iii) suppress the composite signal if the value of the first sensor signal falls outside the pre-established range of acceptable first sensor signal values, and
   d) display means connected to said signal processing means to receive said composite signal to provide feedback to the subject in the form of a display that is generated in response to the composite signal,
   whereby the user may receive feedback in the form of a display arising from the composite signal, but only when the first sensor signal value falls inside the range of pre-established acceptable first sensor signal values.

13. A method for training a subject to perform a specified physical activity comprising:
   a) providing a first body sensor for monitoring a subject's movements, said first body sensor producing first output signals in response to the kinesthetic performance of the subject;
   b) providing signal processing means connected to receive the first output signals and generate a first display control signal with a value as a function of the first output signals;

c) establishing a range of acceptable values for the first output signals produced by the first body sensor;
d) providing display means connected to said signal processing means to receive the first display control signal to provide feedback to the subject in the form of a first display that is generated in response to the first display control signal until the subject is able to generate first output signals that fall within the pre-established range of acceptable first output signal values; then discontinuing said first display and,
e) providing second and third body sensors for monitoring the subject's movements, said second and third sensors producing second and third output signals in response to the performance of the subject;
f) delivering the second and third output signals to the signal processing means and generating a composite signal with a value as a function of the values of the first and second output signals;
g) providing the composite signal to the display means to provide feedback to the subject in the form of a display that is generated in response to the composite signal, but only while the first sensor display signal value falls inside the pre-established range of acceptable first output sensor signal values;
whereby the user may receive feedback in the form of a display arising from the composite signal, but only when the first sensor signal value falls inside the pre-established range of acceptable first sensor signal values.

14. An apparatus as in claim 1 wherein the sensors are body contacting sensors.

15. An apparatus as in claim 1 wherein the sensors comprise at least one EMG sensor.

16. An apparatus as in claim 1 wherein the display means comprises a video screen.

17. An apparatus as in claim 1 wherein the display means comprises a cursor moveable on the display means in response to the composite signal.

* * * * *